United States Patent
Khripin et al.

(10) Patent No.: US 12,540,232 B2
(45) Date of Patent: Feb. 3, 2026

(54) ELASTOMERIC COMPOSITION REINFORCED WITH GROUND-BIOCHAR

(71) Applicant: COMPAGNIE GENERALE DES ETABLISSEMENTS MICHELIN, Clermont-Ferrand (FR)

(72) Inventors: Constantine Khripin, Greenville, SC (US); Jeremy Mehlem, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 660 days.

(21) Appl. No.: 17/790,215

(22) PCT Filed: Dec. 30, 2020

(86) PCT No.: PCT/US2020/067499
§ 371 (c)(1),
(2) Date: Jun. 30, 2022

(87) PCT Pub. No.: WO2021/138444
PCT Pub. Date: Jul. 8, 2021

(65) Prior Publication Data
US 2023/0067289 A1 Mar. 2, 2023

(30) Foreign Application Priority Data
Dec. 31, 2019 (WO) ............... PCT/US2019/069123

(51) Int. Cl.
C08K 9/04 (2006.01)
C08K 3/04 (2006.01)
C08K 11/00 (2006.01)

(52) U.S. Cl.
CPC ............ *C08K 9/04* (2013.01); *C08K 3/04* (2013.01); *C08K 11/00* (2013.01); *C08K 2201/005* (2013.01)

(58) Field of Classification Search
CPC . C08K 9/04; C08K 3/04; C08K 11/00; C08K 2201/005
See application file for complete search history.

(56) References Cited

U.S. PATENT DOCUMENTS 9,951,218 B2 * 4/2018 Bastioli ............... B60C 1/00
2022/0348782 A1 * 11/2022 Palmer ............... C09D 7/63

FOREIGN PATENT DOCUMENTS

WO 2019210132 A1 10/2019

OTHER PUBLICATIONS

Peterson, 2019 (disclosed in IDS) (Year: 2019).*
(Continued)

Primary Examiner — Robert S Jones, Jr.
Assistant Examiner — Elizabeth Amato
(74) Attorney, Agent, or Firm — Hahn Loeser & Parks LLP (57) ABSTRACT

This disclosure provides methods for grinding biochar composition for use as a filler in elastomeric compositions. Such methods include providing a biochar composition comprising particulate, and grinding the biochar composition with a grinding fluid until the biochar is characterized as having an average particulate size less than substantially 1 micrometer. Optionally, such methods may include passivating the biochar composition during or after grinding by covering a sufficient portion of the surface pores sized 10 nanometer and smaller of the particulate forming the ground biochar composition. Curable elastomeric compositions including biochar and cured elastomeric products are also provided.

20 Claims, 7 Drawing Sheets

| INGREDIENT | CARBON BLACK ELASTOMERIC COMPOSITION | BIOCHAR ELASTOMERIC COMPOSITION |
|---|---|---|
| ELASTOMERS | | |
| SBR 2300 | 100 phr | 100 phr |
| FILLERS | | |
| N326 | 60 phr | 0 phr |
| BIOCHAR | 0 phr | 70 phr |
| CHEMICALS | | |
| 6PPD | 2 phr | 2 phr |
| DPG | 2 phr | 2 phr |
| ZnO | 2 phr | 1 phr |
| SAD | 3.2 phr | 3.2 phr |
| CURATIVES | | |
| S | 1.5 phr | 1.5 phr |
| CBS | 3 phr | 3 phr |

(56) References Cited

OTHER PUBLICATIONS

Xiao Jiang et al: "Micro-nano-engineered nitrogenous bone biochar developed with a ball-milling technique for high-efficiency removal of aquatic Cd(II), Cu(II) and Pb(II)", Journal of Hazardous Materials, vol. 387, Dec. 26, 2019.
Peterson Steven C, Sriraam R Chandrasekaran, Brajendra K Sharma: "Birchwood biochar as partial carbon black replacement in styrene-butadiene rubber composites", ResearchGate Journal of Elastomers and Plastics, vol. 48 Mar. 9, 2015, pp. 1-12.
Peterson Steven C: "Utilization of low-ash biochar to partially replace carbon black in styrene-butadiene rubber composites", Journal of Elastomers and Plastics, vol. 45, No. 5, Sep. 5, 2013, pp. 487-497.
Peterson S C et al: "Using heat-treated starch to modify the surface of biochar and improve the tensile properties of biochar-filled styrene-butadiene rubber composites", Journal of Elastomers & Plastics, vol. 51, No. 1, Feb. 2019.
International Search Report with Written Opinion for PCT/US2020/067499 dated Mar. 29, 2021.
International Search Report with Written Opinion for PCT/US2019/069123 dated Oct. 8, 2020.

* cited by examiner

| INGREDIENT | CARBON BLACK ELASTOMERIC COMPOSITION | BIOCHAR ELASTOMERIC COMPOSITION |
|---|---|---|
| ELASTOMERS | | |
| SBR 2300 | 100 phr | 100 phr |
| FILLERS | | |
| N326 | 60 phr | 0 phr |
| BIOCHAR | 0 phr | 70 phr |
| CHEMICALS | | |
| 6PPD | 2 phr | 2 phr |
| DPG | 2 phr | 2 phr |
| ZnO | 2 phr | 1 phr |
| SAD | 3.2 phr | 3.2 phr |
| CURATIVES | | |
| S | 1.5 phr | 1.5 phr |
| CBS | 3 phr | 3 phr |

ELASTOMERIC COMPOSITION REINFORCED WITH GROUND-BIOCHAR

CROSS-REFERENCE WITH RELATED APPLICATIONS

This application claims priority to, and the benefit of, International (PCT) patent application no. PCT/US2019/069123, filed Dec. 31, 2019 with the US Receiving Office, which is hereby incorporated by reference.

BACKGROUND

There is a desire to use renewable materials in the manufacture of products. In the case of tires and other products formed of elastomeric compositions that must be cured, a major component is the filler. Currently, fillers include silica and carbon black, each of which are derived from non-renewable sources. Accordingly, there is a need to develop fillers derived from renewable sources for the manufacture of tires and tire components, such as bead fillers, gum strips, and skim stock for the formation of belt and carcass layers reinforced with elongate textile or metal reinforcements, as well as the manufacture of other elastomeric products, such as conveyor belts, gaskets, tractor treads, for example.

SUMMARY

Embodiments of the disclosure include methods for grinding biochar composition for use as a filler in elastomeric compositions. Such methods include a biochar composition comprising particulate. The biochar composition is ground with a grinding fluid to reduces the size of the biochar, such as until the biochar is characterized as having an average particulate size less than substantially 1 micrometer. Other sizes are contemplated herein. In particular instances, the grinding fluid is substantially a solvent. For example, the solvent may be an alcohol, such as ethanol, methanol, or isopropanol, for example. In other variations, the solvent may be toluene, acetone, or water. The grinding fluid may be provided as necessary to achieve a desired biochar particle size, and in certain instances, the grinding fluid is provided as a ratio of grinding fluid mass to biochar mass of 2:1 to 15:1. Optionally, grinding may be performed using grinding media, such as ceramic beads for example.

Such methods may optionally include passivating the biochar composition during or after grinding by covering a sufficient portion of the surface pores, such as those pores sized 10 nanometer and smaller of the particulate forming the ground biochar composition, for example, to facilitate curing compatibility between the biochar and the elastomer used in the elastomeric composition. In passivating, a passivating agent may be used, such as in an amount sufficient to cover the portion of surface pores. In certain embodiments, the passivating agent is a proton acceptor, that is, a base (a Brønsted-Lowry base). In particular exemplary embodiments, the basic passivating agent is diphenyl guanidine (DPG) or N-1,3-dimethylbutyl-N-phenylenediamine (6PPD). The passivating agent may be a cure accelerator, such as diphenyl guanidine (DPG). The passivating agent may be an antioxidant, such as N-1,3-dimethylbutyl-N-phenylenediamine (6PPD). The passivating agent may be an oxygen scavenger, such as hydroquinone or Co(II) acetylacetonate. In addition to those mentioned, the passivating agent may be selected from a group consisting of polyethylene glycol (PEG), rosin amine, rosin, and di-tertbutyl catechol. While various amounts of passivating agent may be employed, in particular instances, 1 to 3 grams or more of the passivating agent may be provided for every 10 grams of biochar. It is also appreciated that an amount of passivating agent may be provided substantially equal to at least 10% to 100% of a cumulative surface pore volume of the biochar to be ground. Other possibilities are described herein.

Particular embodiments of such methods may optionally include pre-grinding the biochar composition if the biochar particulate is greater than 10% in size relative to the milling media until the biochar composition particulate is equal to or less than 10% in size relative to the milling media.

Particular embodiments of this disclosure include a curable elastomeric composition for use in a cured elastomeric product or a cured elastomeric product itself, either such composition including an elastomer and 1 to 200 phr or more of biochar filler formed of particulate, where a majority of the particulate is less than 1 micrometer. One or more curatives may also be included. In other variations, 5 to 50 phr is employed. Optionally, in certain embodiments, the curable or cured elastomeric composition is free of any non-renewable filler. Additionally or separately, in any such curable or cured elastomeric composition, a majority of pores of the majority of the particulate is covered by a passivating agent. Other variations of the curable or cured elastomeric composition are within the scope of this disclosure, arising as a result of the methods disclosed herein.

DRAWINGS

The foregoing and other objects, features, and advantages will be apparent from the following more detailed descriptions of particular embodiments, as illustrated or exemplified in the accompanying drawings wherein like reference numbers, symbols, or the like represent like parts, features, or characteristics of particular embodiments.

DETAILED DESCRIPTION

As noted above, there is a desire to use renewable materials in the manufacture of products and develop fillers derived from renewable sources for the manufacture of elastomeric products. Accordingly, the resulting sub-micron ground biochar may be used in any elastomeric composition (either in the form of a cured composition or as a mixture for forming the cured composition) as a complete substitute for any non-renewable filler, such as carbon black and silica, for example, such that the elastomeric composition is free of any non-renewable filler, such as carbon black and silica. In other instances, the sub-micron ground biochar may be used with reduced amounts of any such non-renewable fillers to form an elastomeric composition. Any such elastomeric composition using the sub-micron ground biochar contemplated herein may be used for any elastomeric product utilizing elastomeric compositions that must be cured (that is, vulcanized), such as any tire tread or other tire component, gasket, conveyor belt, etc.

The elastomeric composition, such as natural or synthetic rubber, for example, using renewable sources as described and contemplated herein utilizes biochar as a filler. Biochar, which is also referred to as pyrolyzed biomass, may be formed using any biomass, such as wood (e.g., pine wood and wood residue), corn stover, wheat straw, oat hulls, rice husk, manure, switchgrass, miscanthus, lignin, and bamboo, for example. Biochar is composed of carbon and is used as a substitute for carbon black. Using biochar as a filler in elastomeric compositions has been hindered by various problems.

First, as-synthesized biochar consists of particles that are generally substantially greater but not less than 100 micrometers (μm). It has now been determined that to be an effective filler for elastomeric compositions, the average biochar size should be reduced to provide an average biochar particle size less than substantially 1 μm or substantially less than 0.4 micrometers, or, in certain instances, substantially equal to 0.1 or 0.2 to 0.35 or 0.4 μm.

Second, while grinding or the like may reduce biochar particle size, the reduced particle still may not be compatible with rubber, that is, natural or synthetic, since biochar is highly porous. Due to its porous nature, biochar (whether in ground or as-synthesized form) absorbs chemicals intended to cure the elastomeric composition. As a result, biochar can display unfavorable curing characteristics, including low crosslink density and low scorch time. Accordingly, there is a need to improve curing characteristics of biochar when used as a filler for elastomeric compositions, such as to reduce or eliminate marching modulus, to improve cure time, and to improve crosslink density. Marching modulus behavior is evidenced in a rheogram, where the torque continues to increase with increasing cure time as the curve approaches maximum torque. To address this issue, it has been found that passivating at least a portion of the porous surface of at least a majority of the biochar particulate sufficiently reduces the porous nature of biochar to facilitate compatibility of the biochar with rubber in the curing of the elastomeric composition. In passivating, at least a portion of the surface pores are covered with a passivating agent (which is also referred to as a "covering agent").

Another issue with biochar is its tendency to create elastomeric compositions that have lower high strain moduli at break relative to elastomeric compositions using carbon black as a filler. Therefore, there is a need to improve high strain modulus and the modulus at break, which provides improved reinforcement, that is, coupling, of the rubber in elastomeric compositions. This improvement may be achieved by grinding the biochar with certain solvents, such as ethanol, for example.

Methods for grinding or sub-micron grinding biochar composition, such as for use as a filler in elastomeric compositions which may be used in the manufacture of elastomeric products, are herein after described in particular embodiments.

Biochar, as-synthesized, can be described as being formed of particulate, where such particulates are generally substantially greater but not less than 100 μm in size because they maintain approximately the dimensions of the starting biomass particles. To ready the as-synthesized biochar for use as a filler in any desired elastomeric composition, a majority or substantially all of the biochar (biochar particulate) is reduced to an average biochar particle size less than substantially 1 μm or substantially less than 0.4 micrometers, or, in other embodiments, substantially equal to 0.1 or 0.2 to 0.35 or 0.4 μm. This is generally performed by grinding the as-synthesized biochar in one or more grinding steps or operations, where grinding to any average size less than 1 μm, including the ranges articulated previously, is referred to sub-micron grinding herein. Accordingly, sub-micron grinding is a form a grinding that is achieving certain desired biochar particle sizes.

It is appreciated that any grinding contemplated herein may be performed using any desired process or apparatus to reduce the particle size of the biochar. For example, in certain instances, grinding is performed by way of a milling operation using any known mill, such as a conical mill, planetary ball mill, agitated media mill, or hammermill, for example. By further example, grinding may be performed using a sonicator or high shear mixer in solvent but without grinding media, or in other variations with grinding media but without solvent.

In particular instances, as part of the one or more grinding steps, a pre-grinding (or initial grinding) operation may be optionally performed prior to one or more subsequent grinding operations, which are also referred to as the "primary" grind or "primary" grinding or grinding steps used to achieve the sub-micron biochar. In particular, pre-grinding may be performed prior to the primary grind when any of the biochar particulates are greater than 10% in size relative to the grinding media used to perform the primary grind, the pre-grinding continuing until all or substantially all (95% or more) of the biochar composition particulate is equal to or less than 10% in size relative to the grinding media. After any pre-grinding, if at all, the biochar is reduced through one or more subsequent primary grinding steps or operations to a desired an average size less than substantially 1 μm or substantially less than 0.4 micrometers, or, in other embodiments, substantially equal to 0.1 or 0.2 to 0.35 or 0.4 μm.

Optionally, to improve the ease of grinding, if any water is present in the biochar, the water is removed or substantially removed to ready the biochar for grinding (initially or for further grinding). Otherwise, the water may remain for grinding. In particular instances, water is removed or substantially removed from the as-synthesized biochar to ready the biochar for any grinding operation, including any pre-grinding operation. Once water is removed and the biochar is initially ground, the atmosphere may be further controlled to prevent water from being reintroduced into the ground biochar, whether for further grinding or to maintain the ground biochar in a final form. It is appreciated that removal of water may occur after any pre-grinding but prior to or during any primary grinding. It is also appreciated that the removal of water may be performed using any desired process. In certain instances, water removal is achieved by applying heat to the biochar composition. For example, the biochar composition may be placed in an oven heated to 150° C. (degrees Celsius) for 2 hours.

After any pre-grinding and/or any water removal, if any, to provide pre-ground and/or dried biochar, the biochar is ground in a primary grinding operation by way of one or more grinding operations to reduce the size of the biochar to an average size of 10 nm to 500 nm or of 100 nm to 300 nm. In performing any such grinding operation, such as the primary grinding operation, the biochar is ground using a grinding fluid, which aids in producing finer particles. The grinding fluid is applied to the biochar prior to or during any grinding step or operation. A variety of different grinding fluids may be employed. In certain instances, the grinding fluid is a solvent. For example, the solvent may be water or substantially water, which includes trace impurities. In other instances, the solvent may be selected from a group consisting of ethanol ($CH_3CH_2OH$), methanol ($CH_3OH$), isopropanol ($CH_3CH_2CH_2OH$), toluene ($C_6H_5CH_3$), and acetone ($CH_3COCH_3$). Ethanol is referred to as ethyl alcohol. Methanol is referred to as methyl alcohol. Isopropanol is also referred to as isopropyl alcohol. Toluene is also referred to as toluol, methylbenzene, and phenylmethane. In yet other instances, the solvent may be an alcohol, such as, for example, ethanol, methanol, or isopropanol. The solvent may also form a ketone. In particular instances, the solvent is provided, for the contemplated grinding operation, according to a particular ratio of solvent to biochar mass of 2:1 to 8:1 or 2:1 to 15:1, while in other instances, the particular ratio of solvent to biochar mass is substantially 4:1. Any solvent contemplated herein may be provided according to any such ratio.

Optionally, grinding media may be employed in performing any of the grinding steps (operations) herein, including pre-grinding and primary grinding operations. In certain instances, the grinding media comprises (includes) or consists of (is limited to) ceramic beads, such as yttria stabilized zirconia (YSZ) media, for example. When grinding by way of milling, grinding media may be referred to as milling media. Optionally, during any grinding operation, any rotational grinding, such when milling, the rotational grinding direction is reversed approximately halfway through the grinding operation. By way of example, in certain instances, grinding is performed using a planetary ball mill, agitated media mill, or other media mill employing any sized milling media, such as, for example, 0.1 millimeters (mm) to 5 millimeters (mm) in size, or in other instances using media 0.3 mm to 3 mm in size.

In an effort to reduce, eliminate, or at least substantially eliminate the ability of the biochar to absorb chemicals, such as may be used to promote and facilitate curing of the rubber composition, the biochar is passivated during or after any grinding, including the primary grinding operation, sufficient to cover a portion or even upwards of a majority or substantially all surface pores 10 nanometer and smaller of the ground biochar composition particulate. To accomplish this, in particular embodiments, a passivating agent (also referred to as a "covering agent") is used during or after grinding, such as the primary grinding operation, sufficient to cover a portion or even upwards of a majority or substantially all surface pores 10 nanometer and smaller of the ground biochar. Any passivating agent may be used suitable for achieving the desired results. In certain instances, the passivating agent is a cure accelerator, such as diphenyl guanidine (DPG), for example. In certain other instances, the passivating agent is a base to form a basic passivating agent, such as, for example, DPG, 6PPD (defined below), PEG, or rosin amine. In other instances, the passivating agent is an antioxidant, such as N-1,3-dimethylbutyl-N-phenylenediamine (6PPD), for example. As a result of the antioxidant being applied to the biochar, the antioxidant-loaded biochar becomes a delayed release antioxidant source. In yet other instances, the passivating agent is an oxygen scavenger, such as hydroquinone or Co(II) acetylacetonate, for example, and as a result of applying the oxygen scavenger to the biochar, the loaded biochar becomes a high capacity oxygen sink. In even other instances, the passivating agent is selected from a group consisting of PEG, rosin amine, rosin, and di-tertbutyl catechol.

It is appreciated that the resulting biochar may be used to form any elastomeric composition for use in forming any cured elastomeric product as contemplated herein, including the manufacture of any tire or tire component. Accordingly, in certain instances, a curable elastomeric composition formulation for use in forming any elastomeric composition in the manufacture of any elastomeric product includes: an elastomer; a sub-micron ground biochar filler having an average particle size less than substantially 1 μm or substantially less than 0.4 micrometers, or, in other embodiments, substantially equal to 0.1 or 0.2 to 0.35 or 0.4 μm, such as may be formed according any of the methods described herein; and curatives. In particular instances, sub-micron ground biochar may be provided without any (that is, "free of") other non-renewable fillers, such as carbon black or silica. In such instances, for example, 1 to 200 phr of sub-micron ground biochar may be provided, or, in another example, 5 to 50 phr of sub-micron ground biochar is employed. In other instances, sub-micron ground biochar may be provided with any other non-renewable fillers, such as carbon black or silica, where any such non-renewable filler is provided in a reduced amount relative to known formulations. In such instances, for example, 1 to 200 phr of sub-micron ground biochar together with all non-renewable fillers, in sum (in total), may be provided. In another example, 5 to 50 phr is employed. It is appreciated, in any formulation, sub-micron ground biochar may be provided from a single biochar source or it may be a blend of different biochar.

It is appreciated that the particle size of biochar may be determined using any known method or apparatus. For example, disc centrifuge photosedimentometry (DCP), density gradient particle sedimentation, laser light scattering (dynamic or static), or light diffraction techniques may be used to determine the particle size of biochar dispersed in water, such as particle size analyzers produced by Malvern Panalytical (e.g., Mastersizer). The number average may be employed to define an average particle size. By further example, an image analysis may be performed, such as by taking an SEM (scanning electron microscope) image at high voltage, 10 kV (kilovolts), and high magnification, such as 2,000-10,000×, produce a high resolution image of the particles, with which particle sizing and counting can be performed (automatically or manually). In particular instances, the particle size measurements may be taken according to the following method, even with regard to determining post-grinding effects. Of note, the particle sized discussed herein may be obtained using the following method, and where such particle sizes were measured herein, the following method was employed. The cured elastomeric composition was cut with a Teflon coated razor blade to create a bulk sample. The sample was imaged using SEM at a high voltage (10 kV) to reveal the individual filler grains as opposed to the composite surface. The images were analyzed using the program ImageJ. First, two copies of the image were created: one filtered with a fine scale filter (0.05 μm radius gaussian blur) and one filtered with a coarse scale filter (1 μm radius). The coarse filtered image was subtracted from the fine filtered image to reveal the particles. The "Make Binary" function was used to create a binary image of the particles, and the "Analyze Particles" function with the "Fit Ellipse" measurement enabled was used to catalogue the particles. Particle diameters were calculated by averaging the major and minor axes of the fitted ellipses.

Figure 1:
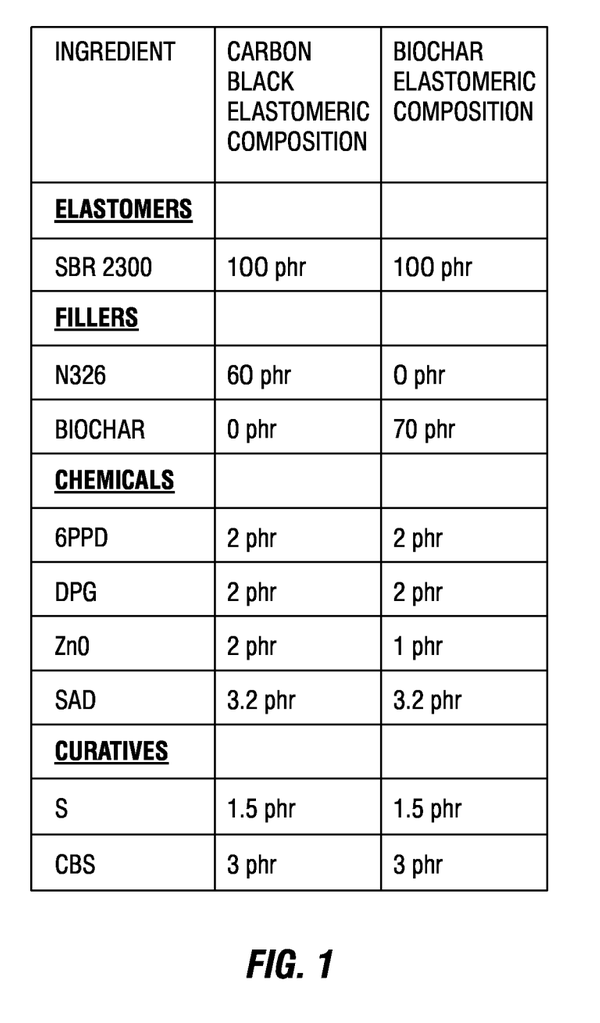
FIG. 1 is a table showing the ingredients for each of a carbon black elastomeric composition and a biochar elastomeric composition for use in evaluating the benefits of solvents and passivating agents in the manufacture of elastomeric compositions, where each is shown in parts per hundred rubber (phr).

The effect of using different solvents for sub-micron grinding biochar in elastomeric materials was evaluated. For the evaluation, the performance of an elastomeric composition using carbon black as a filler was compared against various elastomeric compositions using biochar ground dry and ground using different solvents. In particular, the formulation for each elastomeric compound was as shown in FIG. 1, where for the biochar composition, different solvents were used in each, the different solvents consisting of water, acetone, ethanol, and toluene. With regard to the formulations shown in FIG. 1, SBR 2300 is a solution styrene butadiene rubber provided by Arlanxeo having a Mooney viscosity of 54 mu as measured according to ASTM D 1646 (1+4 @100° C.), a vinyl content of 18%, and an average styrene content of 27.1. N326 is a carbon black. 6PPD is N-(1,3-Dimethylbutyl)-N'-phenyl-p-phenylenediamine, DPG is dipropylene glycol, ZnO is zinc oxide, SAD is stearic acid, S is Sulphur, and CBS is N-cyclohexyl-2-benzothiazolesulfenamide. It is noted, for the tests conducted underlying FIGS. 9 and 10, in lieu of using 60 phr of N326 carbon black (as was used for the tests underlying FIGS. 7 and 8), 65 phr of N772 carbon black was employed in the formula listed in FIG. 1.

For these evaluations, Rogue Biochar (as-synthesized) was obtained from Oregon Biochar Solutions, which was produced by pyrolysis of softwood (pine) at approximately 500 degrees C. and characterized as having biochar particulate having a surface area of about 450 $m^2$/g (meters$^2$/gram), and a pH of 10.5. The Rogue Biochar was ground according to the following process for use in the elastomeric compositions being evaluated using the different solvents noted previously:

1. The as-synthesized biochar was placed in an oven at 150° C. for 2 hours to remove any water which may be present.
2. Since the biochar will be ground with 1 mm milling media, if the biochar particles are equal to or larger than 100 μm, the biochar were pre-ground with a mill to achieve a biochar particle size less than 100 μm in size.
3. After any pre-grinding, the biochar was ground according to a primary grinding operation using a planetary ball mill with the following contents placed in the mill fill jar (in this instance, a 500 cubic centimeters (cc) stainless steel fill jar was employed):
    a. 500 g of YSZ (yttria stabilized zirconia) media, forming 1 mm diameter ceramic beads to operate as milling media
    b. 10 g dried biochar
    c. 40 g solvent
4. The primary grinding was performed for 6 hours at 45 revolutions per minute (rpm), switching the direction of revolution halfway through the grinding operation (i.e., after 3 hours).
5. The ground biochar/media mixture was dried in a vacuum oven at 50° C.
6. The media was then separated from the ground biochar by sieving using a sieve of appropriate hole size, such as, for example, a size 30 when using the 1 mm beads described in this example.

Figure 2:
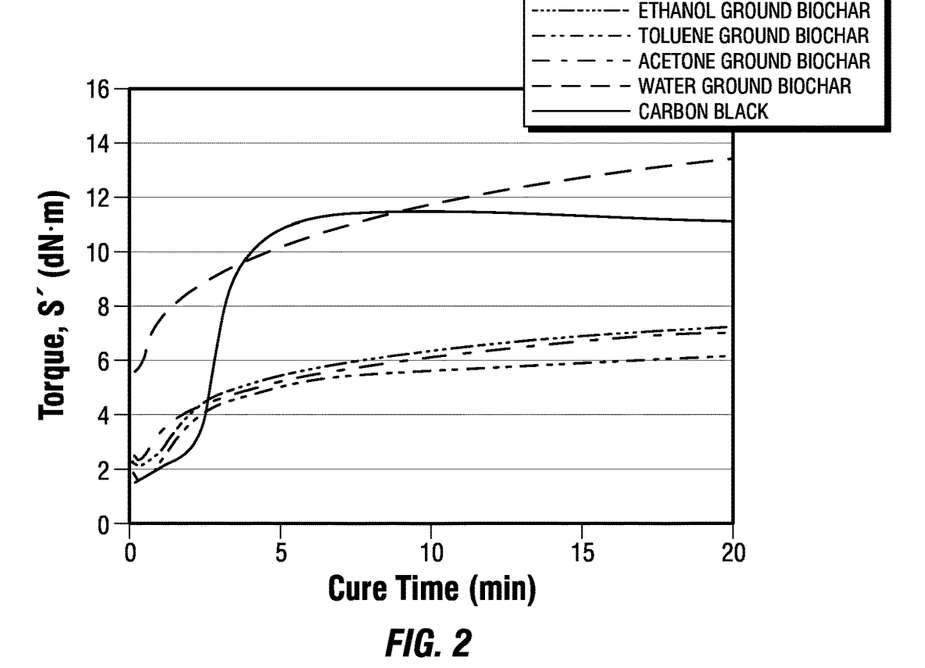
FIG. 2 is a graph (rheogram) showing curing performance of the compositions of FIG. 1, where different biochar elastomeric compositions were made using different solvents to sub-micron grind the biochar, that is, to grind the biochar until the biochar is formed of particles that are on average less than 1 micrometer (in size, or, in certain instances, substantially measure 10 nanometers (nm) to 500 nm or 100 nm to 300 nm, where torque is shown plotted against cure time.

With reference to FIG. 2, torque curing properties were evaluated for each of the elastomeric compositions listed in FIG. 1, where different biochar compositions were prepared using biochar ground with the different solvents indicated above. These elastomeric compositions were tested to measure and quantify curing characteristics. The curing characteristics were measured on a rotorless shear rheometer and more specifically, on an RPA 2000 rheometer manufactured by Alpha Technologies. For the examples provided below, the test samples were cured in the RPA 2000 at 165° C. for 20 minutes at a frequency of 1.67 Hz (hertz) and 0.05 deg arc. The elastomeric composition using water ground biochar shows very high initial torque, suggesting the particles are incompatible with rubber and have flocculated. Ethanol, toluene and acetone similarly show low maximum torque, indicating low crosslink density. The results also show low scorch time and a marching modulus, since the torque continues to increase without plateauing with increasing time.

Figure 3:
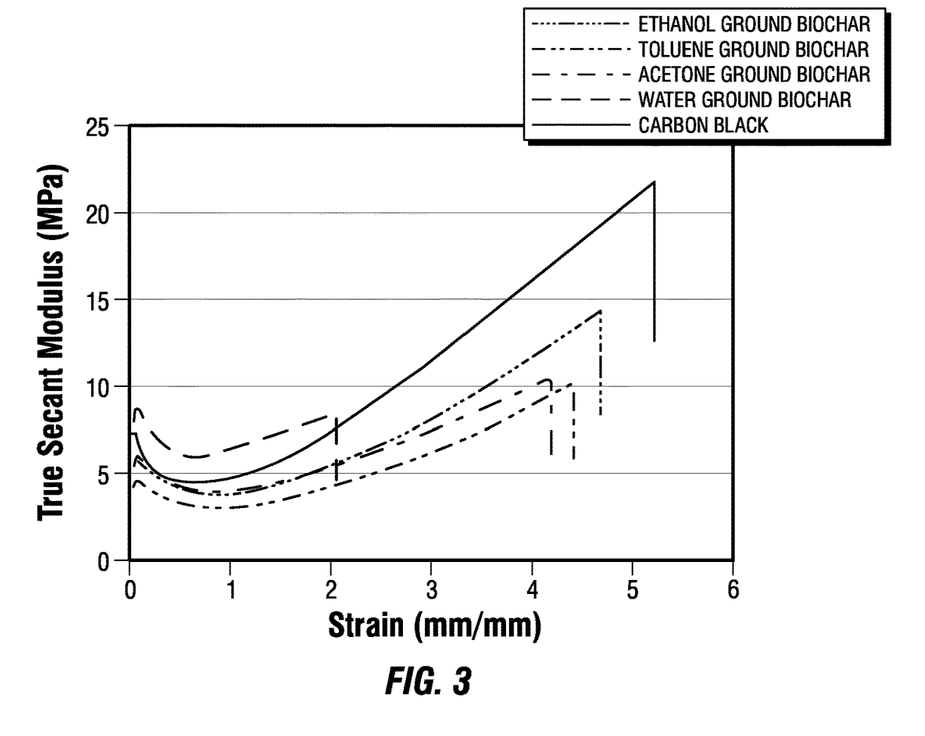
FIG. 3 is a graph showing stress-strain performance of the compositions of FIG. 1, where different biochar elastomeric compositions were made using different solvents to sub-micron grind the biochar and compared against an elastomeric composition including N326 carbon black, where true secant modulus is shown plotted against strain.

With reference to FIG. 3, tensile testing evaluations were conducted for each of the elastomeric compositions listed in FIG. 1, where different biochar compositions were prepared using biochar ground with the different solvents indicated above. These elastomeric compositions were tested to measure and quantify tensile properties. The tensile properties were measured using an Instron 5966 Extensometer at 23° C. in accordance with ASTM Standard D412 on ASTM C test pieces. With regard to tensile properties, it is usually desirable for the material to have a high strain at break and high modulus at break. In both of these categories, the elastomeric composition using ethanol ground biochar performed the best. In FIG. 1, the true secant modulus (TSM) is shown plotted against strain. The true secant modulus is measured as a function of the strain or elongation, that is to say, for a given elongation, the ratio of the extension stress, divided by the true cross section of the test specimen, to the elongation. Stated in the form of an equation, true secant modulus TSM=F*(1+strain)/A/strain, where F is the force and A is the initial cross-sectional area of the test specimen. The true secant modulus is expressed in MPa. Breaks are shown where the true secant modulus ceases to increase and immediately drops at a particular strain.

Figure 4:
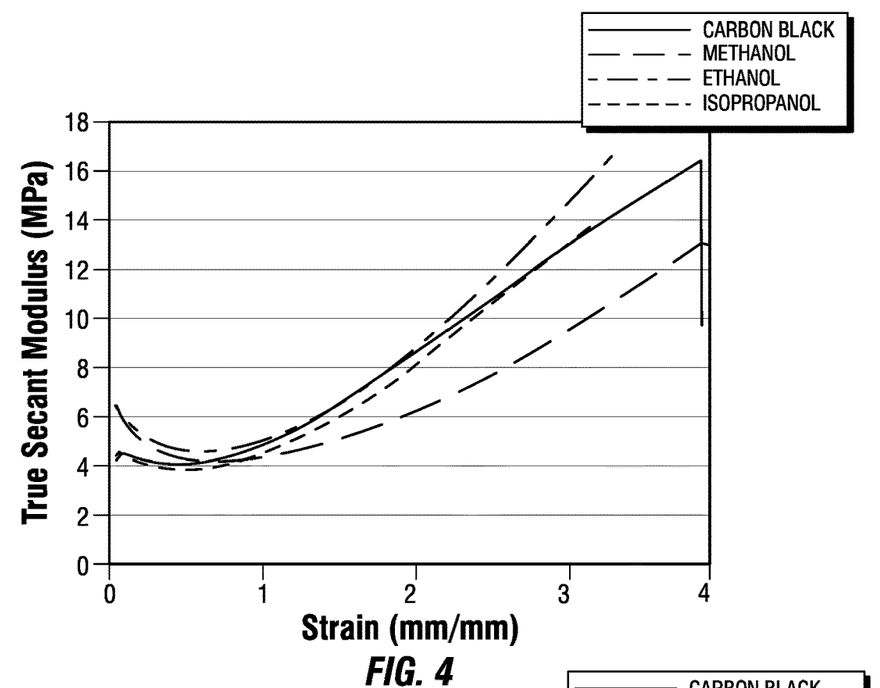
FIG. 4 is a graph showing stress-strain performance of the compositions of FIG. 1, where different biochar elastomeric compositions were made using different solvents to sub-micron grind the biochar and compared against an elastomeric composition using N772 carbon black in lieu of N326 carbon black, where true secant modulus is shown plotted against strain.

With reference to FIG. 4, tensile testing evaluations were conducted for each of the elastomeric compositions listed in FIG. 1 in the same manner as described in the preceding paragraph in association with FIG. 3, where, in these instances, different biochar compositions were prepared using biochar ground with certain alcohols, namely, ethanol, methanol, and isopropanol. In these instances, N772 carbon black was employed in lieu of N326 carbon black as was used in the compositions evaluated in the preceding paragraphs in association with FIG. 3. In comparison to ethanol, methanol is more polar due to higher mass fraction of OH groups and isopropanol is more viscous due to larger molar mass. As noted previously, it is usually desirable for the material to have a high strain at break and high modulus at break in evaluating tensile properties. Consistent with the prior evaluation associated with FIG. 3, ethanol performed more optimally than the other solvents tested. While not performing quite as well as ethanol, the other alcohols (methanol and isopropanol) performed reasonably well in relation to carbon black, especially when comparing these results to the relational performance of other non-alcohol solvents to carbon black shown in FIG. 3.

Figure 11:
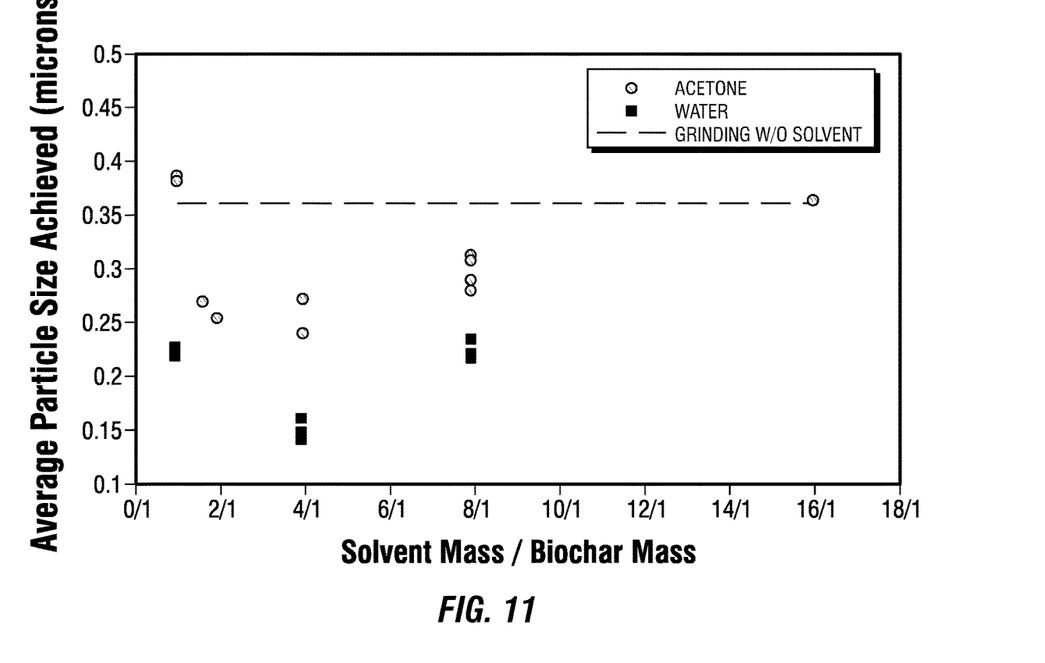
FIG. 11 is a graph showing the biochar particle sizes achieved by sub-micron grinding biochar separately using water and acetone solvents, where achieved number average particle size is shown plotted against the ratio of solvent mass to biochar mass employed for sub-micron grinding.

In sum, when considering the combined performances in FIGS. 2 to 4, ethanol ground biochar was observed to be the optimal solvent for biochar grinding when using biochar in elastomeric compositions, yet all alcohols provided good results relative to the other solvents tested. With reference to FIG. 11, a grinding test was conducted to consider the optimal amount of solvent for sub-micron grinding, where ground particle sizes were measured after grinding using different ratios of solvent mass to biochar mass, where such tests were conducted using the same biochar (Rogue). As can be observed in FIG. 11, in grinding the same biochar composition separately using different ratios of water and acetone relative to the biochar, water achieved smaller ground biochar particle sizes than acetone. Further, acetone and water each performed most optimally at ratio of solvent mass to biochar mass of 2:1 to 8:1, while in similar tests (not shown) acetone performed acceptably with a ratio up to 15:1.

The effect of using different passivating agents during biochar grinding was also evaluated in the use of biochar in elastomeric compositions. In evaluating the effects of passivating agents, the Rouge Biochar was ground according to the previously recited process, with ethanol being used exclusively as the solvent, the exception being the addition of the passivating agent to the grinding process. The same formulations shown in FIG. 1 were evaluated, using the differently ground biochar and ethanol as the solvent for the elastomeric compositions employing biochar. In using passivating agents during biochar grinding, 0 to 4 grams of DPG were placed into the fill jar together with the ethanol, biochar, and media for evaluation against elastomeric compositions using carbon black.

According to the manufacturer of Rogue Biochar, the biochar contains approximately 0.15 cc/g (cubic centimeters/grams) of nanopores of approximately 1 nm diameter (10 angstroms) and smaller and approximately 0.15 cc/g of nanopores approximately 1 to 10 nm diameter (10 to 100 angstroms). In other words, over half the pores measuring approximately 10 nm or less ("nano-pores") are less than 1 nm while the other half measure approximately 1 to 10 nm in size. Therefore one would need at least approximately 0.15 g of passivating agent per gram of biochar to passivate (cover) the pores of 1 nm and less in size, and at least approximately 0.3 g of passivating agent per gram of biochar to passivate pores of 10 nm and less in size, assuming a density of 1. For other biochar, it is possible different amounts of passivating agent may be needed to sufficiently cover a desired amount of nano-pores.

Figure 5:
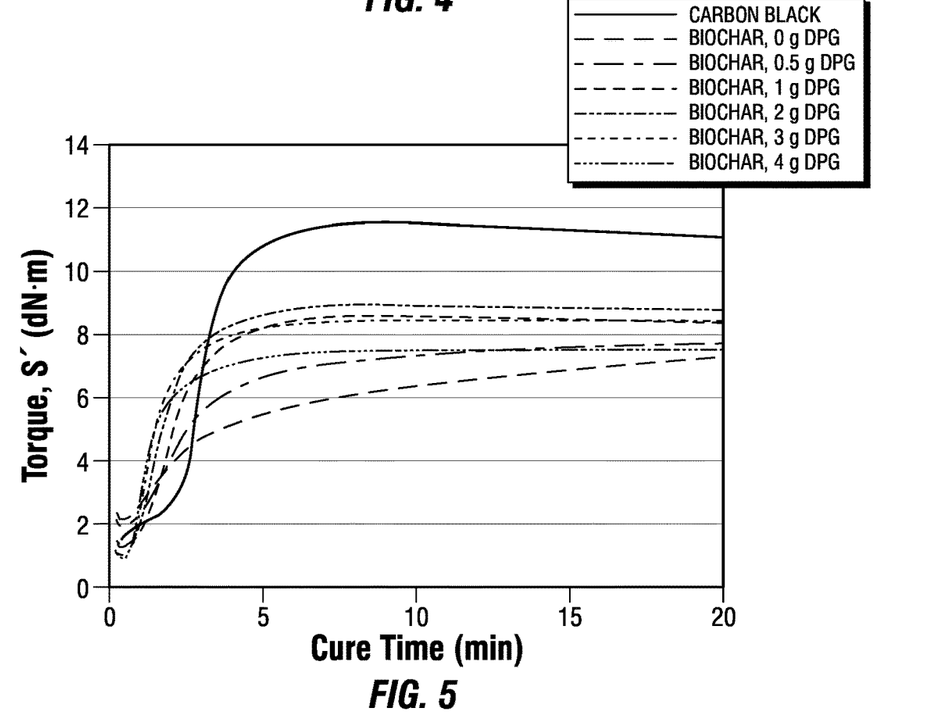
FIG. 5 is a graph (rheogram) showing curing performance of the compositions of FIG. 1, where different biochar elastomeric compositions were made using different amounts of a passivating agent (DPG) to sub-micron grind the biochar, where torque is shown plotted against cure time.

With reference to FIG. 5, torque curing properties were evaluated for elastomeric compositions including biochar, where the biochar was ground without any passivating agent and with the DPG passivating agent. Upon review, it is evident that without DPG, the torque marches and does not reach a high level. As a result, a long period of time would be required for a complete cure. With the addition of DPG during grinding, the cured state is reached sooner and the maximum torque increases, indicating greater curing efficiency.

Figure 6:
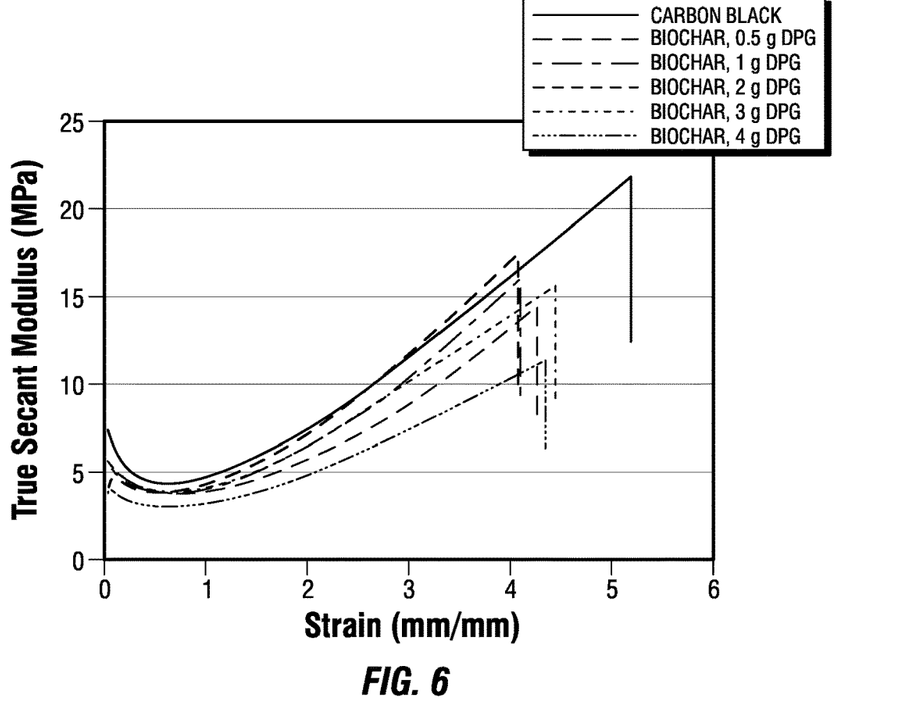
FIG. 6 is a graph showing stress-strain performance of the compositions of FIG. 1, where different biochar elastomeric compositions were made using different amounts of a passivating agent (DPG) to sub-micron grind the biochar, where true secant modulus is shown plotted against strain.

With reference to FIG. 6, the tensile properties were evaluated, the chart showing true secant modulus versus strain. Breaks are shown where the true secant modulus ceases to increase and immediately drops at a particular strain. Upon review, all elastomeric compositions evaluated containing biochar and DPG broke at a notably lower strain than did the elastomeric composition containing carbon black.

Upon review, it appears that when the amount of DPG starts to exceed the pore volume, the DPG begins to act as a diluent. Thus, an optimal amount of DPG, or more broadly, of any passivating agent, is 2 g per 10 g of biochar based upon these test results, which is believed to be sufficient to cover a sufficient portion of the pores sized 10 nm or less so provide desired improvements in curing performance. More broadly, based upon the test results, substantially 1 to 3 grams (g) of passivating agent, such as DPG, for example, per 10 g of biochar provides desirous results. Stated differently, an amount of passivating agent is provided at least equal to 10%, 20% or 30% and upwards of at least 60% or 100% of the pore volume provides desirous results.

In another example, the effects of using different types of passivating agents is evaluated. The same process was followed as with the second example, except that only 2 g of the different passivating agents per 10 grams (g) of biochar were added during grinding for each elastomeric composition containing biochar. The solvent used was for each elastomeric composition containing biochar was acetone for chemicals 1-3 listed below and ethanol for chemicals 4-7 listed below. The different passivating agents tested included:

1. diphenyl guanidine (DPG);
2. N-1,3-dimethylbutyl)-N-phenyl-p-phenylenediamine (6PPD) an antioxidant, which may be useful to provide a delayed-release antioxidant source in the rubber;
3. hydroquinone, an oxygen scavenger, which may be useful to absorb oxygen in the rubber. Another alternative which could be used is Co(II) acetylacetonate;
4. polyethylene glycol (PEG);
5. rosin amine;
6. di-tertbutyl catechol; and,
7. rosin.

These passivated elastomeric compositions together with non-passivated elastomeric compositions containing biochar or carbon black were tested to measure and quantify curing characteristics and tensile properties. The curing characteristics were measured on a rotorless shear rheometer and more specifically, on an RPA 2000 rheometer manufactured by Alpha Technologies. For the examples provided below, the test samples were cured in the RPA 2000 at 165° C. for 20 minutes at a frequency of 1.67 Hz and 0.05 deg arc. The tensile properties were measured using an Instron 5966 Extensometer at 23 degrees C. in accordance with ASTM Standard D412 on ASTM C test pieces.

Figure 7:
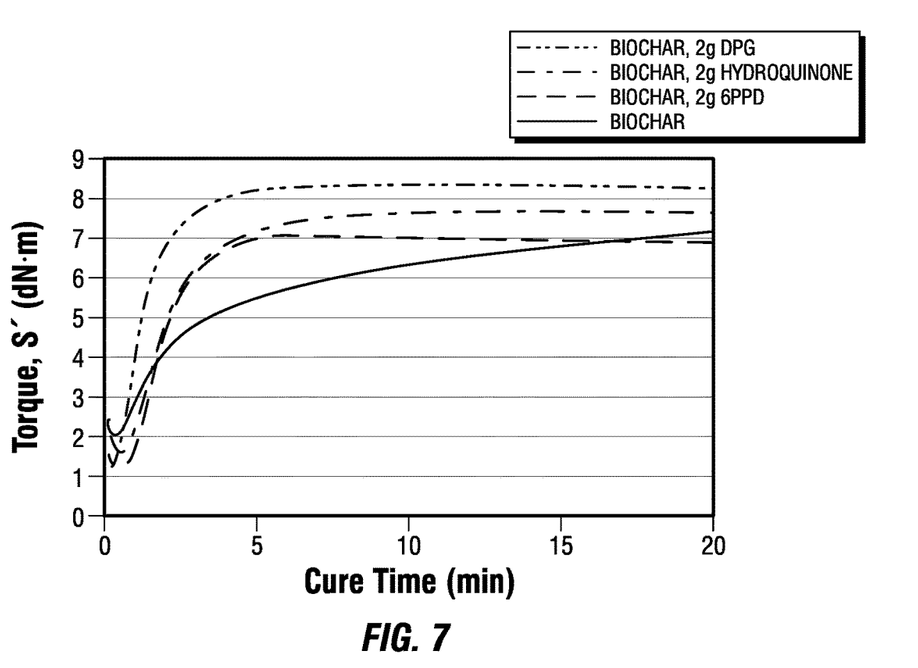
FIG. 7 is a graph (rheogram) showing curing performance of the compositions of FIG. 1, where different biochar elastomeric compositions were made using different types of passivating agents to sub-micron grind the biochar, where torque is shown plotted against cure time.
Figure 9:
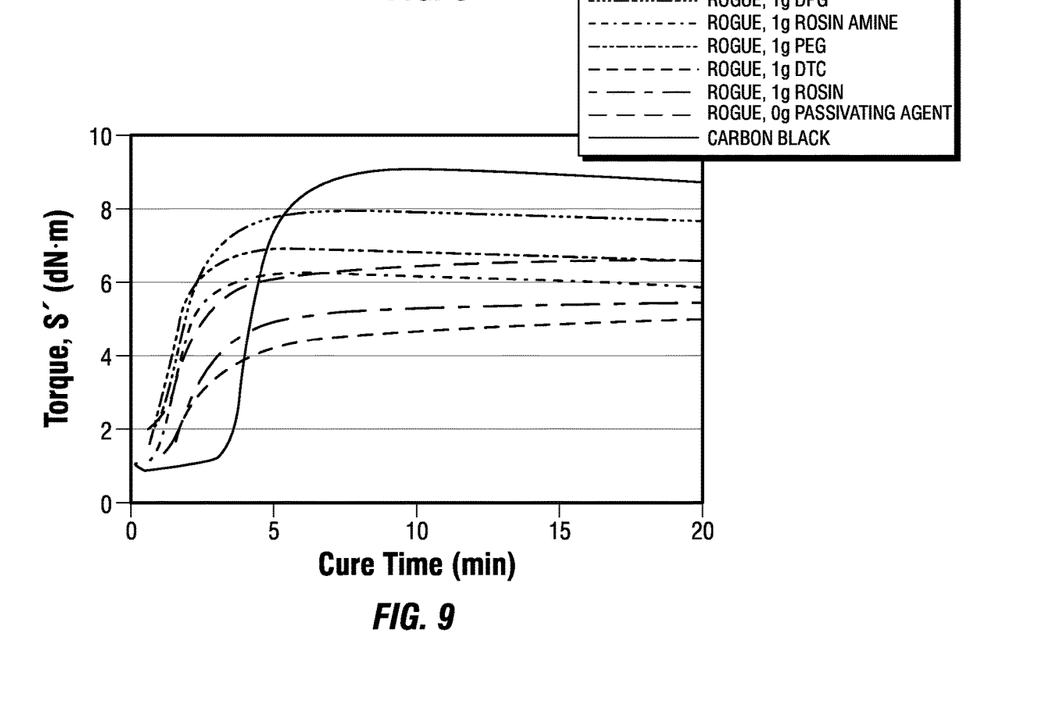
FIG. 9 is a graph (rheogram) showing curing performance of the compositions of FIG. 1, with the exception that the 60 phr of N326 carbon black was substituted with 65 phr of N772 carbon black, where different biochar elastomeric compositions were made using different types of passivating agents to sub-micron grind the biochar, where torque is shown plotted against cure time.

With reference to FIGS. 7 and 9, curing properties of certain elastomeric compositions prepared with biochar ground with the use of passivating agents are shown. One issue with using biochar when not employing passivating agents during grinding is the "marching modulus" exhibited by the elastomeric composition during curing. A "marching modulus" indicates a modulus that continues to increase during curing, indicating the crosslinking network is continuing to evolve. When a proton-accepting passivating agent is used (e.g., 6PPD, DPG, PEG, rosin amine), the curing curve and the corresponding modulus reaches a maximum. When proton-donating passivating agents are used (e.g., hydroquinone, rosin, DTC), the cure curve and the corresponding modulus does not reach a maximum and continues to evolve, exhibiting a marching modulus. While proton-accepting passivating agents are the most desirable for cure characteristics by not exhibiting a marching modulus, all passivating agents showed an improvement in tensile properties relative to elastomeric compositions employing biochar ground without any passivating agent.

Figure 8:
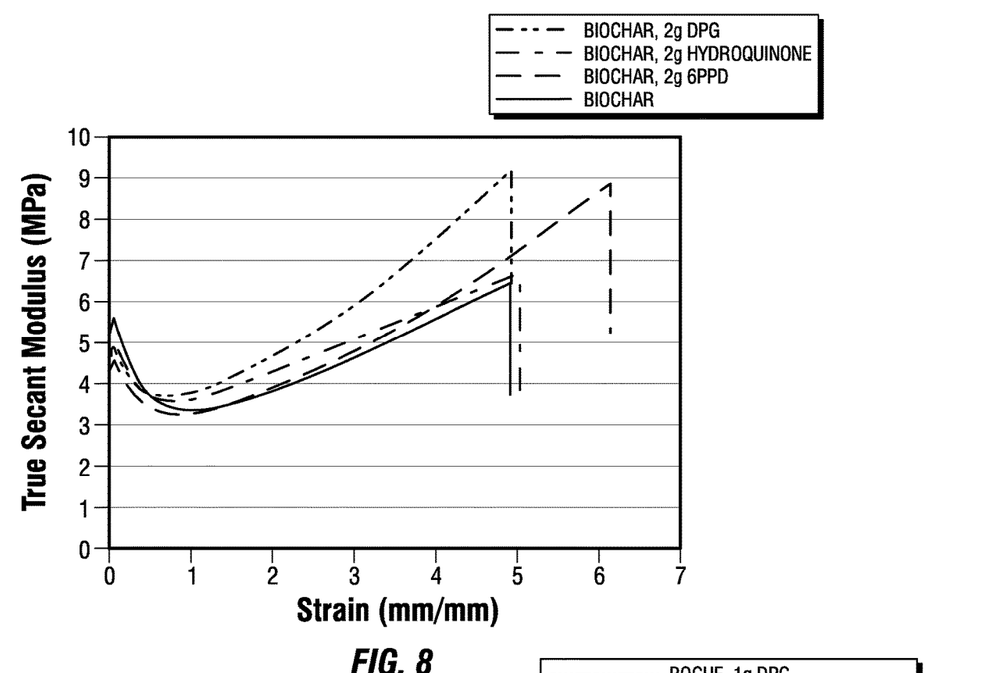
FIG. 8 is a graph showing stress-strain performance of the compositions of FIG. 1, where different biochar elastomeric compositions were made using different types of passivating agents to sub-micron grind the biochar, where true secant modulus is shown plotted against strain.
Figure 10:
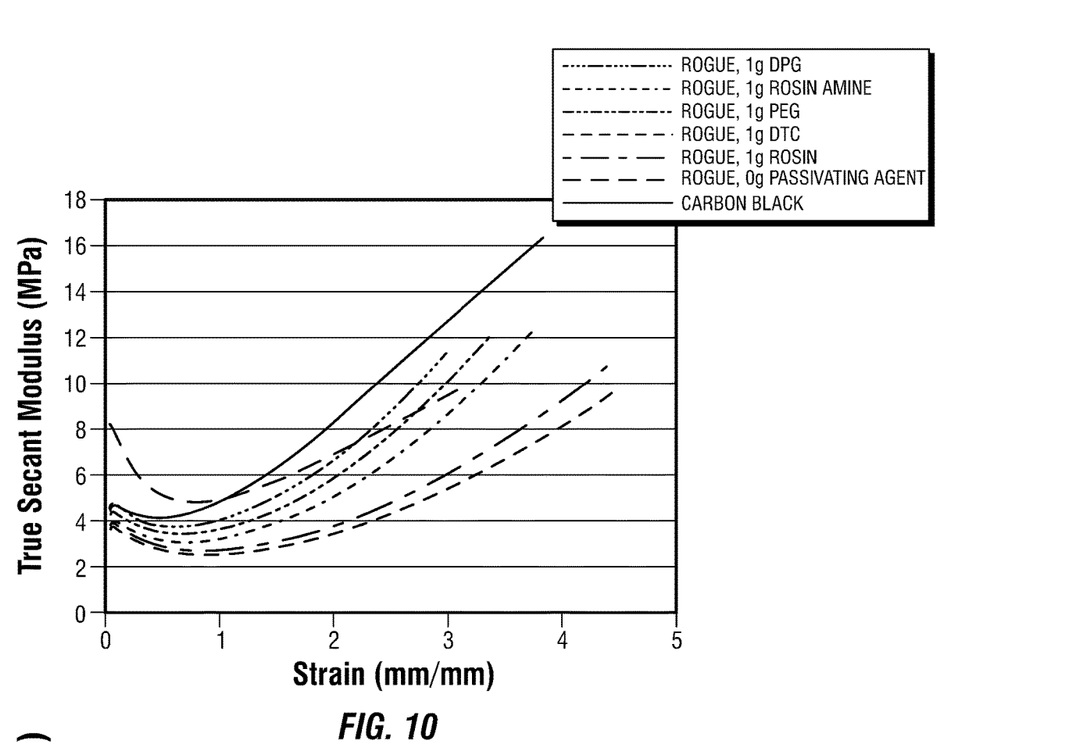
FIG. 10 is a graph showing stress-strain performance of the compositions of FIG. 1, with the exception that the 60 phr of N326 carbon black was substituted with 65 phr of N772 carbon black, where different biochar elastomeric compositions were made using different types of passivating agents to sub-micron grind the biochar, where true secant modulus is shown plotted against strain.

With reference now to FIG. 8, DPG and 6PPD provide the highest modulus (true secant modulus) at high strain/break. Further, DPG provides higher overall crosslinking density, while 6PPD provides higher strain at break, so both may be advantageous. With reference to FIG. 10, other passivating agents showing acceptable results included PEG, DPG, and rosin amine. Rosin and DTC, which are acidic passivating agents, provided high strain at break but low stress at break, which may be acceptable but is less desirable. Acidic passivating agents such as rosin and di-tertbutyl catechol (DTC) worked less well relative to the basic passivating agents. Nevertheless, all passivating agents showed a lower low-strain modulus (that is, at the modulus at or below 1 mm/mm), indicating less filler flocculation, and a higher modulus slope at high strain (that is, the modulus above 1 mm/mm strain), indicating better coupling with filler, compared to biochar ground without use of any passivating agent (see, e.g., FIG. 10). Breaks are shown in FIG. 8 where the true secant modulus ceases to increase and immediately drops at a particular strain and in FIG. 10 where the true secant modulus ceases to increase and immediately stops.

With reference to Tables 1A and 1B below, the results of each of a pair of studies (study 1 and 2) are provided, which includes: "$t_{max}$", which is the time (in minutes) it took for the cure to reach maximum rigidity (modulus); "NL" or non-linearity, which represents energy loss corresponding to the Payne Effect; and, the slope of the curve at maximum strain ($E_{max}$). Proton acceptors are bases or basic passivating agents. Proton donors are acids or acidic passivating agents. As can be seen, all passivating agents forming a proton acceptor performed better than acidic passivating agents. In particular, basic passivating agents) DPG, 6PPD, PEG 2500, and rosin amine performed better than the listed acidic passivating agents. As can be seen, the proton acceptors (bases) generate a composition characterized as having a lower $t_{max}$, resulting in less time for each cure to reach maximum rigidity. Further, each proton acceptor is characterized as having a lower non-linearity, which leads to lower energy loss. Lastly, each proton acceptor has a higher slope at maximum strain at break, indicating that the rubber (elastomer) is better coupled to the biochar. It is noted that the loading of the biochar and the biochar source used between Study 1 and 2 were different as stated previously, and by virtue of the first Study employing biochar sourced from New Hampshire Biochar, so the results in each study is not directly comparable to the results in the other study.

| Additive | Study | Structure | Name | CAS# | Proton Donor/ Acceptor | Chemical Group |
|---|---|---|---|---|---|---|
| None | 1 | | None | | | |
| DPG | 1 | | 1,3-Diphenylguanidine | 102-06-7 | proton acceptor | amine |
| 6PPD | 1 | | N-(1,3-Dimethylbutyl)-N'-phenyl-1,4-benzenediamine | 793-24-8 | proton acceptor | amine |

-continued

| Additive | Study | Structure | Name | CAS# | Proton Donor/Acceptor | Chemical Group |
|---|---|---|---|---|---|---|
| HQ | 1 | (structure of hydroquinone) | hydroquinone | 123-31-9 | proton donor | hydroxyl |
| None | 2 | | none | | | |
| Rosin | 2 | (structure of abietic acid) | abietic acid | 514-10-3 | proton donor | carboxylic acid |
| DTC | 2 | (structure of 3,5-di-tert-butylcatechol) | 3,5-Di-tert-butylcatechol | 1020-31-1 | proton donr | hydroxyl |
| DPG | 2 | | 1,3-Diphenylguanidine | 102-06-7 | proton acceptor | amine |
| PEG 2500 | 2 | (structure of PEG) | Polyethylene glycol | 25322-68-3 | proton acceptor | ether |
| Rosin Amine | 2 | (structure of dehydroabietylamine) | Dehydroabietylamine | 61790-47-4 | proton acceptor | amine |

TABLE 1B

| Additive | Study | Proton Donor/Acceptor | Chemical Group | $t_{max}$(min) | NL | slope @$E_{max}$ |
|---|---|---|---|---|---|---|
| None | 1 | | | 19.6 | 1.66 | 0.95 |
| DPG | 1 | proton acceptor | amine | 10.5 | 1.40 | 1.41 |
| 6PPD | 1 | proton acceptor | amine | 9.8 | 1.20 | 1.37 |
| HQ | 1 | proton donor | hydroxyl | 15.4 | 1.40 | 0.86 |
| None | 2 | | | >20.0 | 1.71 | 2.77 |
| Rosin | 2 | proton donor | carboxylic acid | >20.0 | 1.39 | 4.00 |
| DTC | 2 | proton donor | hydroxyl | >20.0 | 1.48 | 3.35 |
| DPG | 2 | proton acceptor | amine | 8.3 | 1.24 | 5.33 |
| PEG 2500 | 2 | proton acceptor | ether | 5.2 | 1.32 | 5.68 |
| Rosin Amine | 2 | proton acceptor | amine | 6.4 | 1.29 | 4.89 |

Figure 12:
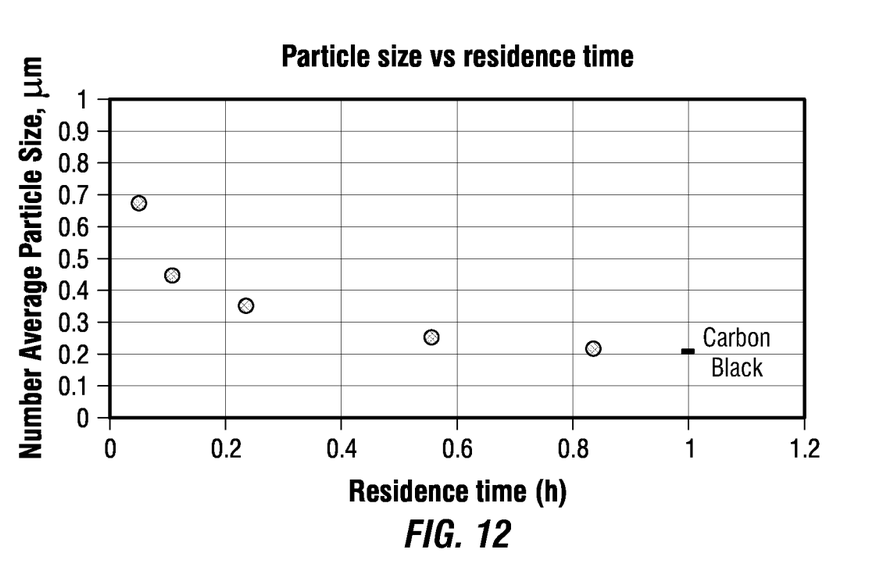
FIG. 12 is a graph showing biochar number average particle sizes achieved by sub-micron grinding for different durations (residence times) as compared to N772 carbon black.

To study the effect of biochar particle size, a large batch of biochar was ground using a flow-through mill, the WAB DYNO-Mill AP-05. The mill was filled with 0.5 millimeter (mm) beads to 60% of total chamber volume and run at a peripheral speed of 8 meters per second (m/s). Subsequently, 300 grams (g) of the ground biochar was mixed with 60 g of DPG and 1800 g of ethanol and the mixture was recirculated through the mill and aliquots of approximately 250 cubic centimeters (cc) were taken at various time intervals. The processed biochar was dried and mixed with rubber (elastomer), cured, and the tensile properties were measured as was done with prior examples. The size was measured using SEM microscopy at 10 kilovolts (kV) and a standard automatic particle counting algorithm. In particular, all particle size measurements identified herein were measured according to the detailed method discussed previously. With reference to FIG. 12, the size of the biochar decreased with grinding time as expected. We can see that under these grinding conditions the size approached carbon black N772 at about 1-hour residence time.

Figure 13:
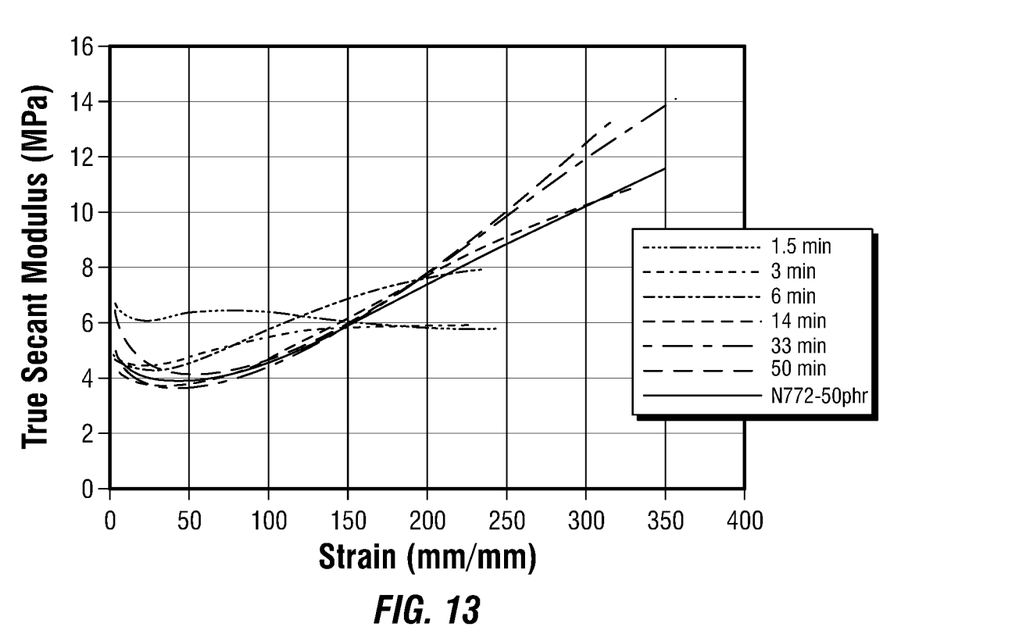
FIG. 13 is a graph showing the stress-strain performance of elastomeric compositions formed using the different sized biochar achieved by the sub-micron grinding processes shown in FIG. 12.

After grinding the biochar for the different residence times, the resulting biochar at the respective sizes was mixed with rubber (elastomer) and cured and thereafter a stress-strain analysis conducted on the cured samples. The stress-strain results are shown in FIG. 13. Upon review, the corresponding properties changed distinctively with different particle size. In particular, the rubber reinforced using the biochar ground for 15 minutes residence time (as opposed to batch grinding time) has properties comparable to carbon black N772. This result is surprising because the average particle size of the biochar ground for 15 minutes is approximately 0.35 μm, which is almost twice the average size of the carbon black N772, which is 0.21 μm in size. As expected, biochar ground to an average particle size of 0.1 and 0.2 micrometers performs well, but it is surprising that biochar that is not as small as carbon black performs similarly to carbon black. The data underlying the results shown in FIG. 13 are listed in Table 2 below:

TABLE 2

| Sample ID | 1 | 2 | 3 | 4 | 5 | Control (N772) |
|---|---|---|---|---|---|---|
| Residence Time, h | 0.05 | 0.11 | 0.24 | 0.55 | 0.83 | — |
| Residence time, min | 3.04 | 6.49 | 14.11 | 33.20 | 49.94 | — |
| Number Average | 0.67 | 0.45 | 0.35 | 0.26 | 0.22 | 0.21 |
| Surface. Average | 2.33 | 1.08 | 0.84 | 0.57 | 0.41 | 0.35 |
| Volume Average | 3.17 | 1.44 | 1.21 | 0.94 | 0.54 | 0.42 |

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

We claim:

1. A method for grinding biochar composition for use as a filler in elastomeric compositions, comprising:
   providing a biochar composition comprising particulate;
   grinding the biochar composition with a grinding fluid until the biochar is characterized as having a number average particulate size of 0.1 micrometers to 0.4 micrometers;
   passivating the biochar composition during or after grinding by covering a sufficient portion of surface pores of the particulate forming the ground biochar composition;
   mixing the biochar composition with an elastomeric composition after the step of passivating;
   and curing the elastomeric composition.

2. The method of claim 1, where the grinding fluid is a solvent comprising an alcohol.

3. The method of claim 2, where the alcohol comprises ethanol.

4. The method of claim 2, where the solvent is selected from a group consisting of ethanol, methanol, isopropanol, toluene, and acetone.

5. The method of claim 1, where the grinding fluid is provided as a ratio of grinding fluid mass to biochar mass of 2:1 to 15:1.

6. The method of claim 1, where in passivating, a sufficient amount of a passivating agent is used to cover the portion of surface pores, the passivating agent being a base.

7. The method of claim 6, where the base is diphenyl guanidine (DPG), N-1,3-dimethylbutyl-N-phenylenediamine (6PPD), polyethylene glycol (PEG), or rosin amine.

8. The method of claim 1, where in passivating, a sufficient amount of a passivating agent is used to cover the portion of surface pores sized 10 nanometer and smaller.

9. The method of claim 1, where in passivating, a sufficient amount of a passivating agent is used to cover the portion of surface pores, the passivating agent being a cure accelerator.

10. The method of claim 1, where in passivating, a sufficient amount of a passivating agent is used to cover the portion of surface pores, the passivating agent being an antioxidant.

11. The method of claim 1, where in passivating, a sufficient amount of a passivating agent is used to cover the portion of surface pores, the passivating agent being an oxygen scavenger.

12. The method of claim 11, where the oxygen scavenger is hydroquinone or Co(II) acetylacetonate.

13. The method of claim 1, where in passivating, a sufficient amount of a passivating agent is used to cover the portion of surface pores, the passivating agent being selected from a group consisting of polyethylene glycol (PEG), hydroquinone, rosin amine, rosin, and di-tertbutyl catechol (DTC).

14. The method of claim 1, where in passivating, a sufficient amount of a passivating agent is used to cover the portion of surface pores, where 1 to 3 grams of the passivating agent is provided for every 10 grams of biochar.

15. The method of claim 1, where in passivating, a sufficient amount of a passivating agent is used to cover the portion of surface pores, where an amount of passivating agent provided is equal to 10% to 100% of a cumulative surface pore volume of the biochar to be ground.

16. A curable elastomeric composition for use in a cured elastomeric product, the composition comprising:

an elastomer;

1 to 200 phr of biochar filler formed of particulate, where a majority of the particulate is sized 0.1 micrometers to 0.4 micrometers and a majority of pores of the majority of the particulate is covered by a passivating agent, and, one or more curatives.

17. The curable elastomeric composition of claim 16, where the composition is free of any non-renewable filler.

18. The composition of claim 16, where the biochar filler was formed using a grinding operation, where the grinding operation was performed on a biochar composition with a grinding fluid until achieving particulate sized 0.1 micrometers to 0.4 micrometers.

19. The method of claim 2, where the alcohol is selected from a group consisting of ethanol, methanol, and isopropanol.

20. The composition of claim 18, where the grinding fluid is a solvent comprising alcohol.

* * * * *